United States Patent
Oda

[11] Patent Number: 5,608,455
[45] Date of Patent: Mar. 4, 1997

[54] INTERLINE TRANSFER CCD IMAGE SENSOR WITH REDUCED DARK CURRENT

[75] Inventor: Kazuya Oda, Asaka, Japan

[73] Assignee: Fuji Photo Film Co., Ltd, Kanagawa, Japan

[21] Appl. No.: 392,401

[22] Filed: Feb. 22, 1995

Related U.S. Application Data

[63] Continuation of Ser. No. 98,048, Jul. 28, 1993, abandoned.

[30] Foreign Application Priority Data

Jul. 30, 1992 [JP] Japan .................................. 4-203959
Aug. 28, 1992 [JP] Japan .................................. 4-230568

[51] Int. Cl.$^6$ ............................................ H04N 9/64
[52] U.S. Cl. .................................. 348/245; 348/243
[58] Field of Search .................................. 348/243, 241, 348/245; H04N 9/64

[56] References Cited

U.S. PATENT DOCUMENTS

| | | | |
|---|---|---|---|
| 4,200,934 | 4/1980 | Hofmann | 348/251 |
| 4,396,351 | 8/1983 | Tanaka | 348/245 |
| 4,498,105 | 2/1985 | Crawshaw | 348/243 |
| 4,553,169 | 11/1985 | Yoshioka et al. | 348/243 |
| 4,602,291 | 7/1986 | Temes | 348/243 |
| 4,760,452 | 6/1988 | Kaneko et al. | 348/243 |
| 4,811,105 | 3/1984 | Kinoshita et al. | 348/249 |
| 5,200,634 | 4/1993 | Tsukada et al. | 257/291 |
| 5,214,272 | 5/1993 | Ueno | 348/243 |
| 5,216,511 | 6/1993 | Tani | 348/243 |
| 5,272,536 | 12/1993 | Sudo et al. | 348/243 |

*Primary Examiner*—Michael Horabik
*Assistant Examiner*—Michael Day

[57] ABSTRACT

An interline transfer CCD image sensor includes a plurality of photodiodes disposed in an optical black area located between the image pickup area and the horizontal charge transfer path, and a processor for calculating the dark current generated in the vertical charge transfer paths and for estimating the dark current components in the image pickup area.

9 Claims, 13 Drawing Sheets

$$\frac{B-A(\text{OB STEP LEVEL})}{5-1(\text{DRIVE LINE NUMBER})} = X = (\text{OB STEP LEVEL INCREMENT PER ONE LINE})$$

INTERLINE TRANSFER CCD IMAGE SENSOR WITH REDUCED DARK CURRENT

This application is a continuation of application Ser. No. 08/098,048 filed on Jul. 28, 1993, now abandoned.

BACKGROUND OF THE INVENTION a) Field of the Invention

The present invention relates to an image pickup device, and more particularly to an image pickup device of a charge coupled device (CCD) type having a number of pixels disposed in a matrix pattern wherein a video signal is transferred in a CCD.

b) Description of the Related Art

Solid state image pickup devices of a CCD transfer type are known which are used in electronic camera, copiers, and other video apparatuses. A number of photodiodes are disposed in a pixel matrix having vertical columns and horizontal rows. Vertical charge transfer paths (VCCDs) are formed adjacent respective photodiode columns, and a horizontal charge transfer path (HCCD) is formed adjacent the ends of respective VCCDs.

For an electronic still cameras or the like using such a solid state image pickup device, there is a demand of exposing all photodiodes (PDs) at the same time and reading video signals separately.

In order to read electric charges stored in photodiodes and transfer them concurrently, it is necessary to use transfer pulses of three or more phases per one pixel or one row. In order to prepare transfer pulses of three or more phases per one pixel, it is necessary to form three or more electrodes per one pixel in a CCD. This is a disadvantage from the viewpoint of fine integration of the device.

A two-phase drive may be performed by forming a potential well and a potential barrier under each electrode. This approach poses a problem of inability of forming potential wells and barriers in a self-aligned manner at a manufacturing process.

As a transfer method eliminating the above disadvantages, an accordion transfer method has been proposed for an image pickup device having built-in photodiodes in a CCD (refer to Philips Technical Review, Vol. 43, No. 1/2, 1986 by A. J. P. Theuwissen and C. H. L. Weijtens).

With the accordion transfer method, it is possible to read all pixels by two electrodes per one pixel or row and to allow all pixels to be exposed at the same time by using an electronic shutter capable of substrate draining. Two electrodes per one pixel is the same number as used in an interline transfer (IT) CCD, a frame transfer (FT) CCD, and a frame interline transfer (FIT) CCD.

FIGS. 12A and 12B are diagrams explaining the accordion transfer method. FIG. 12A is a potential diagram explaining how the potential under successive electrodes of a transfer path changes with time. FIG. 12B is a schematic diagram in the form of a plan view explaining the motion of electric charges by the accordion transfer method.

Referring to FIG. 12A, electrodes on a transfer path include odd-numbered electrodes Od and even-numbered electrodes Ev. Under each electrode, a potential well or potential barrier is formed on a charge transfer path. The potential energy of an electron in the charge transfer path is diagrammatically shown by a solid polygonal line. The height of the polygonal line indicates the potential energy of electrons.

The electron's potential energy under each odd-numbered electrode is first lowered to form potential wells and store electric charges qa, qb, and qc. If the potential barrier between adjacent potential wells is lowered under this condition, electric charges in the adjacent potential wells are mixed together.

To avoid mixture of electric charges, the electron's potential energy under the rightmost even-numbered electrode is lowered to expand the potential well to the amount corresponding to two electrodes. The electric charge qa therefore moves to the right and distributes over the area corresponding to two electrodes. Next, the electron's potential energy at the left side area of the potential well storing the electric charge qa is raised, and at the same time the electron's potential energy at the right side potential barrier is lowered. As a result, the electric charge qa moves to the right by the amount corresponding to one electrode and distributes over the area corresponding to two electrodes.

Under this condition, the potential barrier corresponding to two electrodes are formed between the electric charges qa and qb. The electric charge qa can be transferred sequentially to the right side by raising the electron's potential energy at the left side and lowering the electron's potential energy at the right side in the above-described manner.

At the next timing after the potential barrier corresponding to two electrodes is formed between the electric charges qa and qb, the electron's potential energy of the potential barrier at the right side of the electric charge qb is lowered so that the electric charge qb is expanded to and distributed over the area corresponding to two electrodes.

At this time, there is a potential barrier corresponding to at least one electrode, and generally two electrodes, between the electric charges qa and qb, preventing a mixture of electric charges. In this manner, electric charges stored in the areas corresponding to every second electrode can be transferred while expanding and distributing them to areas corresponding to two electrodes with a gap of two electrodes.

FIG. 12B is a schematic diagram showing the distribution of electric charges transferred in the above manner. In FIG. 12B, the abscissa represents time, and the ordinate represents electrodes on a transfer path. Under the condition shown at the leftmost side, the electric charges qa, qb, qc, and qd are stored in the areas corresponding to every second electrode in the upper half of the transfer path. These electric charges are sequentially transferred to the lower areas of the transfer path, starting from the electric charge at the lowest area, by sequentially forming potential wells and barriers corresponding to two electrodes, i.e., by expanding the electric charge distribution over a two-fold area.

During the charge transfer, the electric charge distributes over the area corresponding to two electrodes, and the potential barrier corresponding to two electrodes is formed between respective electric charges. In this manner, electric charges stored in the areas corresponding to every second electrode can be transferred without a mixture of electric charges. Under the condition at the rightmost side in FIG. 12B showing the completion of charge transfer, the electric charges qa, qb, qc, and qd, are again distributed at every second electrode.

The generation of potential wells and barriers during the charge transfer is analogous to the operation of a musical instrument accordion when its bellows are gradually expanded and again compressed. This charge transfer method is therefore called an accordion transfer method. With this method, one signal per one photodiode row can be transferred using two electrodes per one row.

The present applicant has presented a domino type transfer method for a solid state image pickup device having a photodiode matrix, VCCDS, and a HCCD. This domino type transfer method performs the charge transfer like the accordion transfer method. However, instead of the frame transfer, electric charges read in the VCCDs are transferred to the HCCD while expanding them by a two-fold scale.

Briefly speaking, this method corresponds to the drive method at the upper half of the transfer path shown in FIG. 12B. Four-phase drive signals like the interline CCD are used. Also with this method, one signal per one photodiode row can be transferred.

It takes time to expand the charge distribution in order to transfer electric charges while expanding space between them. The time that a video signal stops on the transfer path differs greatly depending upon the position in the transfer path taken by the video signal. The transfer time required for each video signal is also different. A dark current is generated on the transfer path so that a large dark current is added to the video information staying on the transfer path during a longer time duration.

In order to compensate for such a dark current component, a light shielding area called an optical black (OB) area is provided to a CCD image pickup device. If a dark current of the same amount is generated in both the image pickup area and the OB area from which a dark current component is derived, the dark current component can be compensated.

FIGS. 13A to 13D are schematic diagrams explaining the function of an OB area. FIG. 13A is a diagram explaining an ideal function of the OB area. In this case, a dark current of the same amount is generated in both the image pickup area and the OB area. Although the base line of the black level is raised by the dark current, it is raised by the same amount in both the image pickup area and the OB area. Therefore, by subtracting a black level at the OB area from a video signal at the image pickup area, the shading component can be compensated to thereby obtain real image information.

FIG. 13B is a diagram showing the base line of image information obtained in the above manner during one field. A real video signal obtained by subtracting a signal from the OB area from the video signal detected at the image pickup area, has a constant black value during one vertical scan period V.

The pixel structure of the image pickup area differs slightly from that of the OB area in that photodiodes in the latter area are covered with an aluminum film. The electrostatic capacitance at the OB area is therefore larger than that at the image pickup area, producing a difference of a dark current between the image pickup area and the OB area.

FIG. 13C is a graph showing the base line of a real video signal. The base line for the OB area is lower than that for the image pickup area. As a result, an OB step is generated between the base line for the image pickup area and that for the OB area.

If a signal from the OB area is subtracted from such a video signal, a video signal with a certain amount of the OB step being added thereto is obtained. The OB step becomes larger as the time that the video signal stays on the vertical charge transfer path becomes longer.

FIG. 13D is a graph showing a change in the base line of a video signal during one field. A video signal read at the start of the vertical scan period V has substantially no OB step because of a short time that the signal stays on the vertical charge transfer path. On the other hand, a video signal read at the end of the vertical scan period has a large OB step because of a long time that the signal stays on the vertical charge-transfer path. Since the OB step increases with a lapse of time, the base line of a video signal changes as indicated by a broken line.

As described above, an OB area provided to a CCD image pickup device inherently generates an OB step which changes the black level of a video signal.

SUMMARY OF THE INVENTION

It is an object of the present invention to provide a CCD image pickup device capable of maintaining the black level constant even if the time that a video signal stays on the charge transfer path changes.

According to one aspect of the present invention, there is provided a CCD image pickup device comprising semiconductor CCD image pickup means having a number of photodiodes disposed in a matrix shape and a plurality of vertical charge transfer paths disposed adjacent each photodiode column and capable of transferring electric signal charges, a black level memory for storing black level data obtained by driving the vertical charge transfer paths under the condition that light is not incident to the CCD image pickup means, and a subtracter for subtracting the black level data from a video signal obtained by projecting a subject image on the CCD image pickup means and driving the vertical charge transfer paths.

The black level of a video signal is stored in the black level memory by driving the vertical charge transfer paths under the condition that light is not incident to the CCD image pickup means.

A real video signal can be obtained by subtracting the black level from the video signal obtained by projecting a subject image on the CCD image pickup means and driving the vertical charge transfer paths. The real video signal obtained in this manner maintains its black level constant even if the level of the OB step changes.

In the above manner, the video signal with the reduced level of the OB step can be obtained by compensating for the dark current component.

Furthermore, it is possible to correct a white scratch or the like by using the black level memory having a capacity corresponding to one frame.

According to another aspect of the present invention, there is provided a CCD image pickup device comprising an image pickup chip including a plurality of vertical charge transfer paths for transferring electric charges, a horizontal charge transfer path for collectively outputting charge signals transferred from the plurality of vertical charge transfer paths, photodiodes disposed in an image pickup area for picking up a video signal, the photodiodes being coupled to each vertical charge transfer path, and photodiodes at a lower OB area, each photodiode at the lower OB area being disposed between the photodiodes at the image pickup area and the horizontal charge transfer path, being coupled to each vertical charge transfer path, being light shielded, and having the same electrostatic characteristics as each photodiode at the image pickup area, and a circuit for calculating and estimating a dark current component of the video signal at the image pickup area in accordance with signals from the photodiodes at the lower OB area.

Since the photodiodes at the OB area has the same electrostatic characteristics as the photodiodes at the image pickup area, a dark current substantially the same as that at the image pickup area is generated in the lower OB area. Using the dark components obtained at the lower OB area, the dark current components in the whole image pickup area can be calculated and estimated at a high precision.

The calculated and estimated dark current components are subtracted from video signals obtained at the image pickup area by projecting a subject image on the CCD image pickup means and driving the vertical charge transfer paths. Accordingly, a real video signal can be obtained at a high precision.

A video signal thus obtained can maintain the black level constant even if the OB step changes. In this manner, the video signal with the reduced level of the OB step can be obtained by compensating for the dark current component.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2A is a plan view showing the pattern of the chip, and FIGS. 2B and 2C are cross sections showing the structures of a pixel at the image pickup area and at the OB area.

FIG. 7A is a plan view showing the pattern of the chip, and FIGS. 7B and 7C are cross sections showing the structures of a pixel at the OBa and OBb areas.

FIG. 9A is a plan view showing a CCD image pickup chip, FIG. 9B is a graph showing an output signal, and FIG. 9C is a block diagram partially showing the video signal processing circuit.

DETAILED DESCRIPTION OF THE PREFERRED EMBODIMENTS

Figure 1:
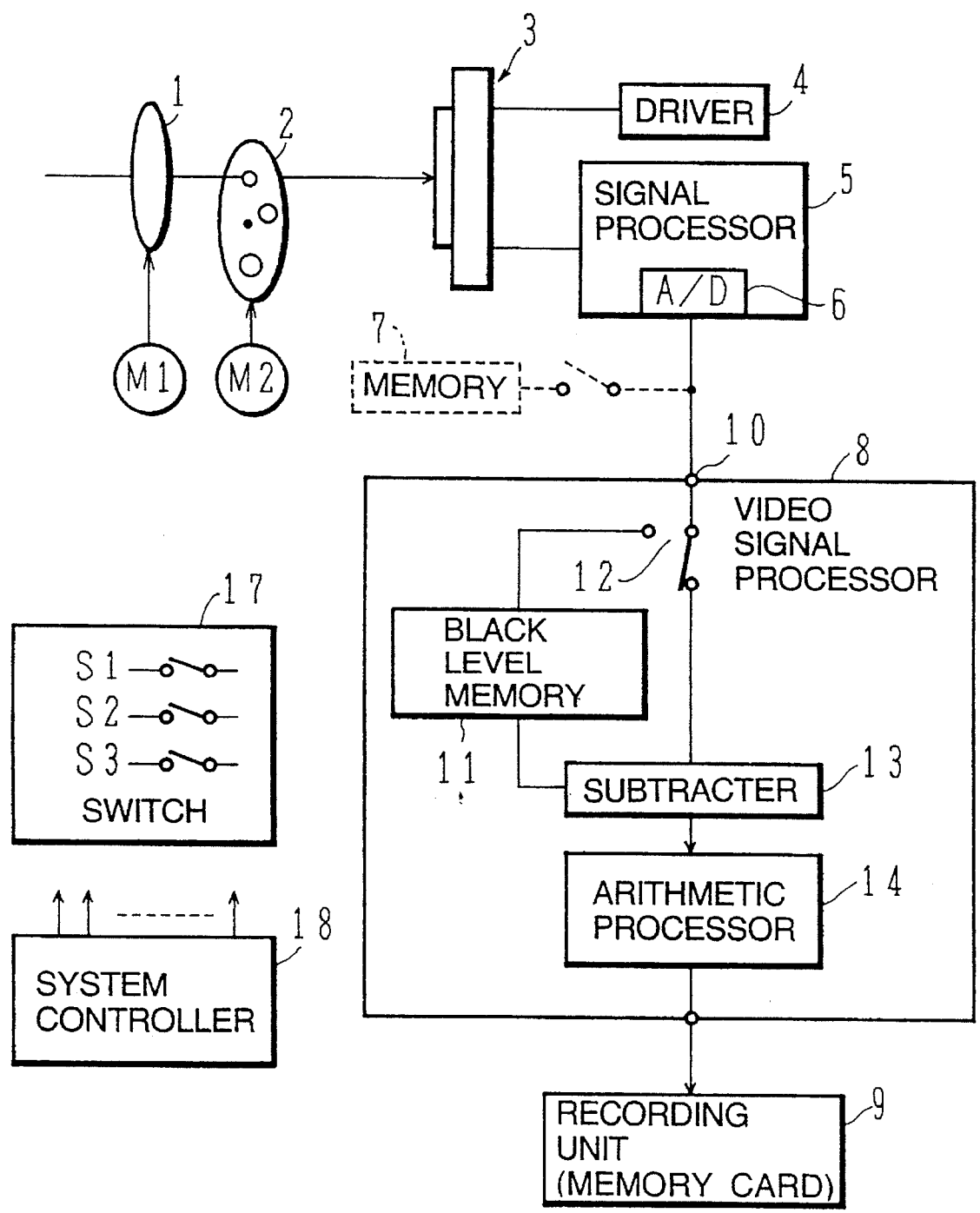
FIG. 1 is a block diagram showing the structure of a CCD image pickup device according to an embodiment of the present invention.

FIG. 1 is a block diagram showing the structure of a CCD image pickup device according to an embodiment of the present invention. Light from a subject is focussed by a lens 1, is passed through an opening of an iris 2, and is projected on a CCD image pickup chip 3. Implemented in the CCD image pickup chip 3 is a semiconductor image pickup circuit including a photodiode matrix, VCCDs, a HCCD and other circuit elements. The iris 2 has a plurality of openings of different diameters and a light shielding area. A driver circuit 4 supplies CCD drive signals to the CCD image pickup chip 3.

A video signal from the CCD image pickup chip 3 is processed by a signal processor 5 to perform a process of detecting a signal level difference at an OB area or other processes. The processed video signal is converted into a digital signal by an A/D converter 6 and inputted to a video signal processor 8.

An input terminal 10 of the video signal processor 8 connected to a movable contact of a change-over switch 12. Fixed contacts of the change-over switch 12 are connected to a black level memory 11 and to a subtracter 13 under the control of a system control circuit 18. A black level signal read from the CCD image pickup chip 3 under a light shielded state is stored in the black level memory 11. A video signal of a focussed image on the CCD image pickup chip 3 is supplied to the subtracter 13 under the control of a system control circuit 18. An output signal from the black level memory 11 is supplied to the subtracter 13 at which the black level signal is subtracted from the video signal of a subject image.

An output signal from the subtracter 13 is supplied to an arithmetic processor 14 to be subjected to a process such as data compression, and outputted from an output terminal to a recording unit 9 which may be a memory card. A memory 7 is provided for storing video signals, although the memory 7 is not used in this embodiment.

The CCD image pickup device has a switch circuit 17 having switches S1, S2, and S3. For example, the switch S1 is a first contact switch for a release switch, the switch S2 is a second contact switch for the release switch, and the switch S3 is a power source switch.

When a switch button on a camera is depressed, the power source switch S8 is first turned on, and thereafter, the first and second contact switches S1 and S2 are successively turned on.

The CCD image pickup device is provided with the system controller 18 for controlling the entire system of the device. When the power source switch S3 is turned on, the CCD image pickup device is powered and enters an image pickup enabled state. When the first contact switch S1 is turned on, the CCD image pickup device enters an automatic exposure and autofocussing automatic exposure and autofocusing mode. In this mode, motors M1 and M2 are driven to select a proper focal length of the lens 1 and a proper opening of the iris 2. A shutter speed is also selected.

Figure 12A:
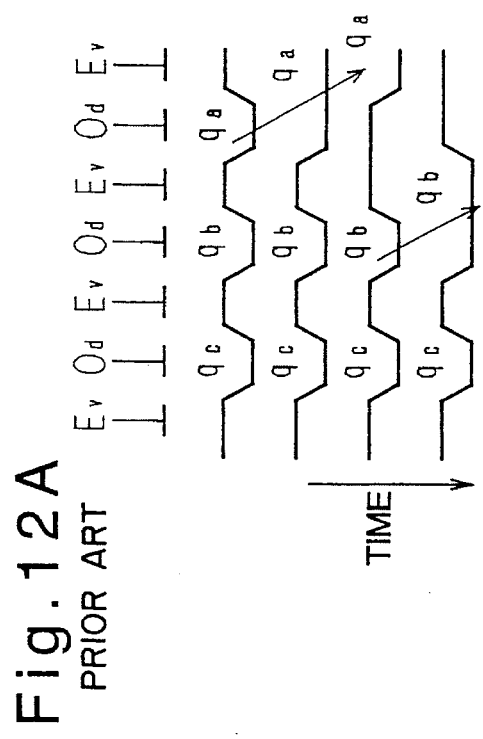
FIGS. 12A and 12B are schematic diagrams explaining the accordion transfer method.
Figure 12B:
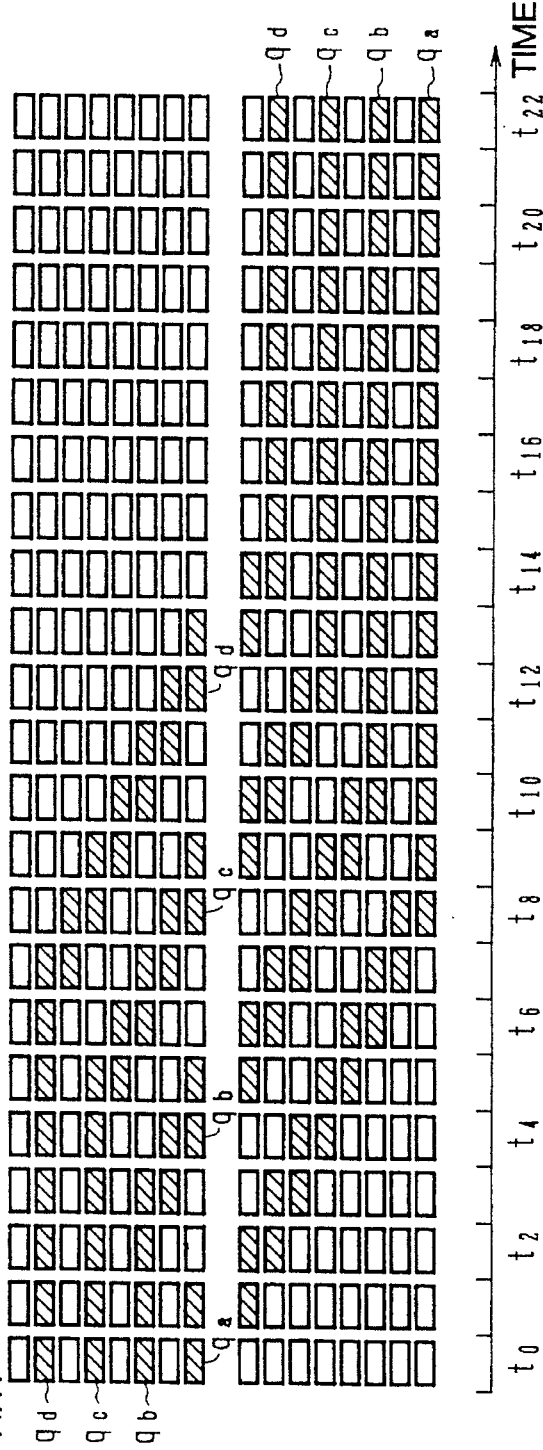
Figure 13A:
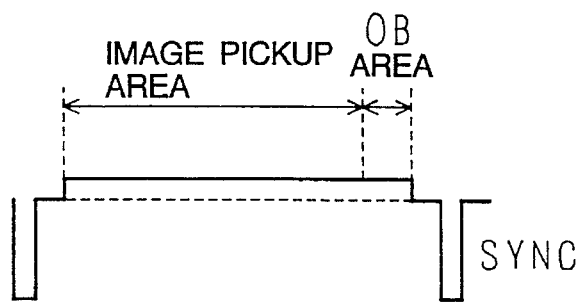
FIGS. 13A, 13B, 13C, and 13D are schematic diagrams explaining the function of an OB area.
Figure 13B:
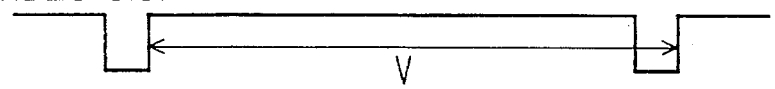
Figure 13C:
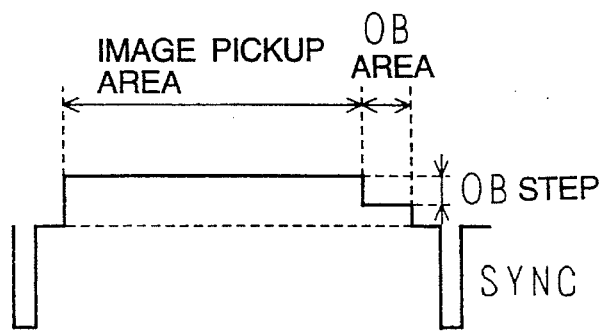
Figure 13D:
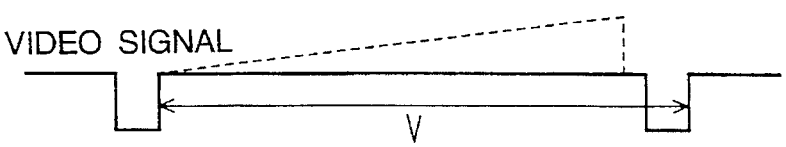

The CCD image pickup chip 3 performs an accordion transfer (or domino transfer) which is described with respect to FIGS. 12A and 12B for the VCCDs. In this case, as described previously, the video signal read from photodiodes stays on the VCCD during a certain time which changes with the position of the video signal on the VCCD.

A video signal staying on the VCCD during a relatively long time receives a relatively large dark current. However, since the corresponding dark current component is stored in the black level memory 11, this black level signal is subtracted from the video signal by the subtracter 13 so that a video signal with the dark current component being removed therefrom can be obtained.

Figure 2A:
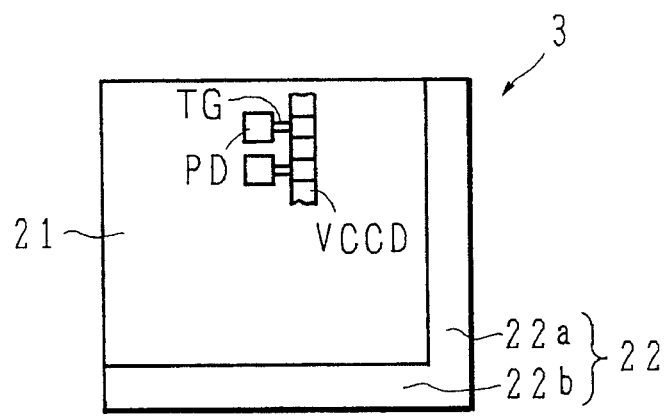
FIGS. 2A, 2B and 2C are diagrams showing the structure of the CCD image pickup chip used by the CCD image pickup device shown in FIG. 1.
Figure 2B:
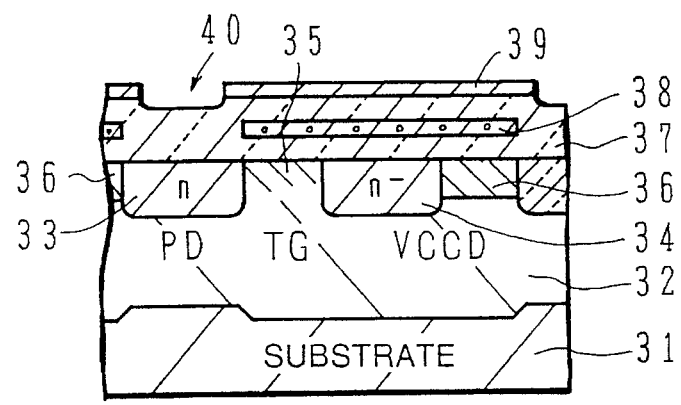
Figure 2C:
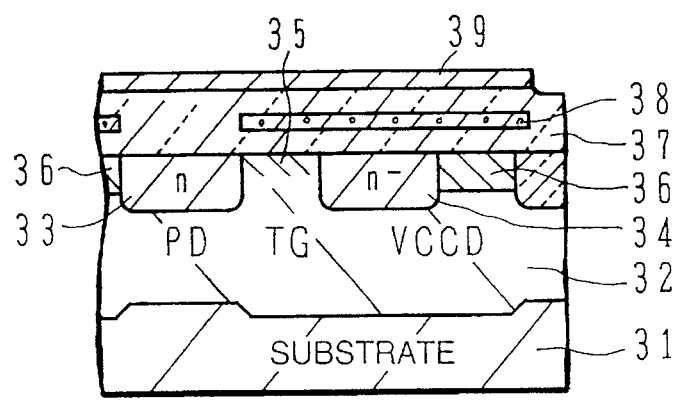

FIGS. 2A, 2B and 2C show the structure of the CCD image pickup chip. FIG. 2A shows the layout of the CCD image pickup chip.

The CCD image pickup chip 3 has an image pickup area 21 on which a subject image is projected, and an OB area 22 covered with a light shielding film such as aluminum. The OB area 22 includes an area 22b disposed at the lower area of the image pickup area 21 and an area 22a disposed at the right side area of the image pickup area 21. As will be described later, the OB area 22a at the right side area of the image pickup area 21 is not necessarily required.

FIG. 2B is a cross section showing the structure of a pixel in the image pickup area.

A p-type well 32 is formed on an n-type Si substrate 31. On the surface of the p-type well 32d, there are formed an n-type region 33 for forming a photodiode PD, an n⁻-type region 34 for forming a VCCD, and a p⁺-type region 35 for forming a transfer gate TG between the photodiode and the VCCD. A p⁺-type region 36 is formed at the periphery of the area in which the photodiode and the VCCD are formed. This region 36 functions as an electrically isolating region.

An insulating film 37 such as $SiO_2$ is formed on the surface of the structure. A polycrystalline silicon gate 38 is formed in the insulating film 37 for the control of potentials at the transfer gate TG and the VCCD. The surface of the insulating film 37 is covered with a light shielding metal layer 39 such as aluminum, and an opening 40 is formed in the light shielding metal layer 39 to allow incident light to inject on the photodiode PD.

With the structure described above, the photodiode PD detects the intensity of incident light. Photoelectrically converted electric charges induced by the incident light are transferred via the transfer gate TG to the VCCD, and picked up therefrom to obtain a video signal of a subject image.

FIG. 2C is a cross section showing the structure of a pixel in the OB area. The structures of the semiconductor substrate and insulating layer 37 are the same as that of the image pickup area shown in FIG. 2B, except that an opening is not formed in the light shielding layer 39 such as aluminum.

As a result, light will not enter the photodiode PD formed on the semiconductor substrate 31. When this OB area is driven in the same manner as the pixel in the image pickup area, an electric charge signal read from the VCCD is only the dark current component.

A difference between the structures of the image pickup area and OB area is a presence or absence of the aluminum light shielding layer 39 over the photodiode PD. This structural difference produces a difference of parasitic capacitance between the pixels in the image pickup area and OB area. Therefore, the amount of dark current generated on the VCCD is affected.

FIGS. 3A, 3B, 3C, 3D, 3E, and 3F are diagrams explaining different levels of an OB step. As shown in FIG. 2A, in the CCD image pickup chip, a number of photodiodes PD are disposed in a matrix shape in the image pickup area 21. VCCD is disposed adjacent each photodiode PD column, with the transfer gate TG coupling the photodiode and VCCD.

Electric charge signals read from the photodiodes PD to the VCCDs are successively transferred downward in the paths. The stay time on the VCCD changes greatly between the video signal stored in the photodiode PD at the lower area in the image pickup area 21 and that stored at the upper area.

For example, the time that the video signal read from the photodiode PD at the lowest row stops on the VCCD is one horizontal scan time or 1 H, and the time required for the video signal to be read to the HCCD is 1 H. In contrast with this, the time that the video signal read from the photodiode PD at the highest row to the VCCD stops for 500 H assuming that the number of rows is 1000, and the time required for the video signal to be transferred to the HCCD is 500 H, requiring 1000 H in total.

Figure 3A:
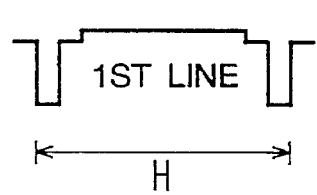
FIGS. 3A, 3B, 3C, 3D, 3E, and 3F are schematic diagrams explaining the influence of an OB step.
Figure 3B:
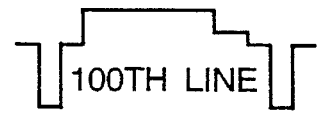
Figure 3C:
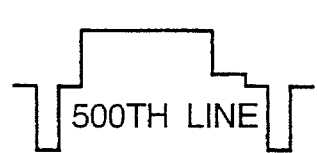
Figure 3D:
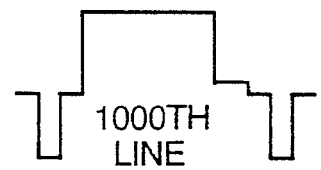

The stop time and transfer time change greatly with the position of a video signal on the VCCD. Therefore, the level of the OB step changes greatly depending on the position of a video signal in the image pickup area, as shown in FIGS. 3A, 3B, 3C and 3D. FIG. 3A shows the OB step for the first line, FIG. 3B shows the OB step for the 200-th line, FIG. 3C shows the OB step for the 500-the line, and FIG. 3D shows the OB step for the 1000-th line.

Figure 3E:
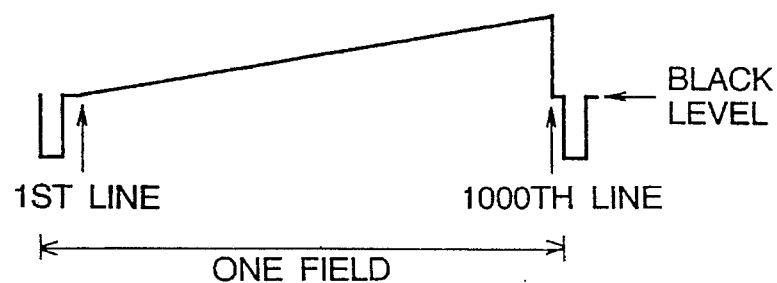

As shown in FIGS. 3A, 3B, 3C and 3D, the base line of a video signal is raised and the level of the OB step becomes large, as the position of the signal in the vertical direction becomes high. The change in the level of the OB step during one field is shown in FIG. 3E. The image is displayed brighter as the base line of a video signal is raised more than the real black level.

Since an inverted or upside-down real image is focussed on the surface of the CCD image pickup chip, a video signal first read is displayed on the highest row of the screen.

Figure 3F:
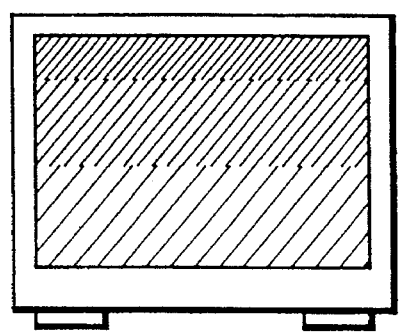

FIG. 3F is a schematic diagram showing the state of a black signal displayed on the screen. A video signal at the upper area of the screen has a low level of the OB step, and so the displayed image is almost a black image.

A dark current increases at the lower area of the screen so that the black level is raised even if light is not incident and a displayed image becomes whiteish. In the CCD image pickup device shown in FIG. 1, black level information such as shown in FIGS. 3E and 3F is stored in the black level memory 11. The video signal is subtracted by the black level signal and thereafter processed by the arithmetic processor 14. As a result, the final video signal has the component of the dark current being removed therefrom as shown in FIG. 3F.

Since the black level signal is subtracted from the video signal by the subtracter 13, the black signal of the OB area at each horizontal line is not necessarily required. Therefore, the OB area 22a in the image pickup area 21 at the right side area may be omitted. When the OB area 22a is omitted, the step as shown in FIGS. 3B, 3C and 3D will disappear.

A change in the base line of a video signal caused by a dark current component is called the OB step in this specification.

Figure 4:
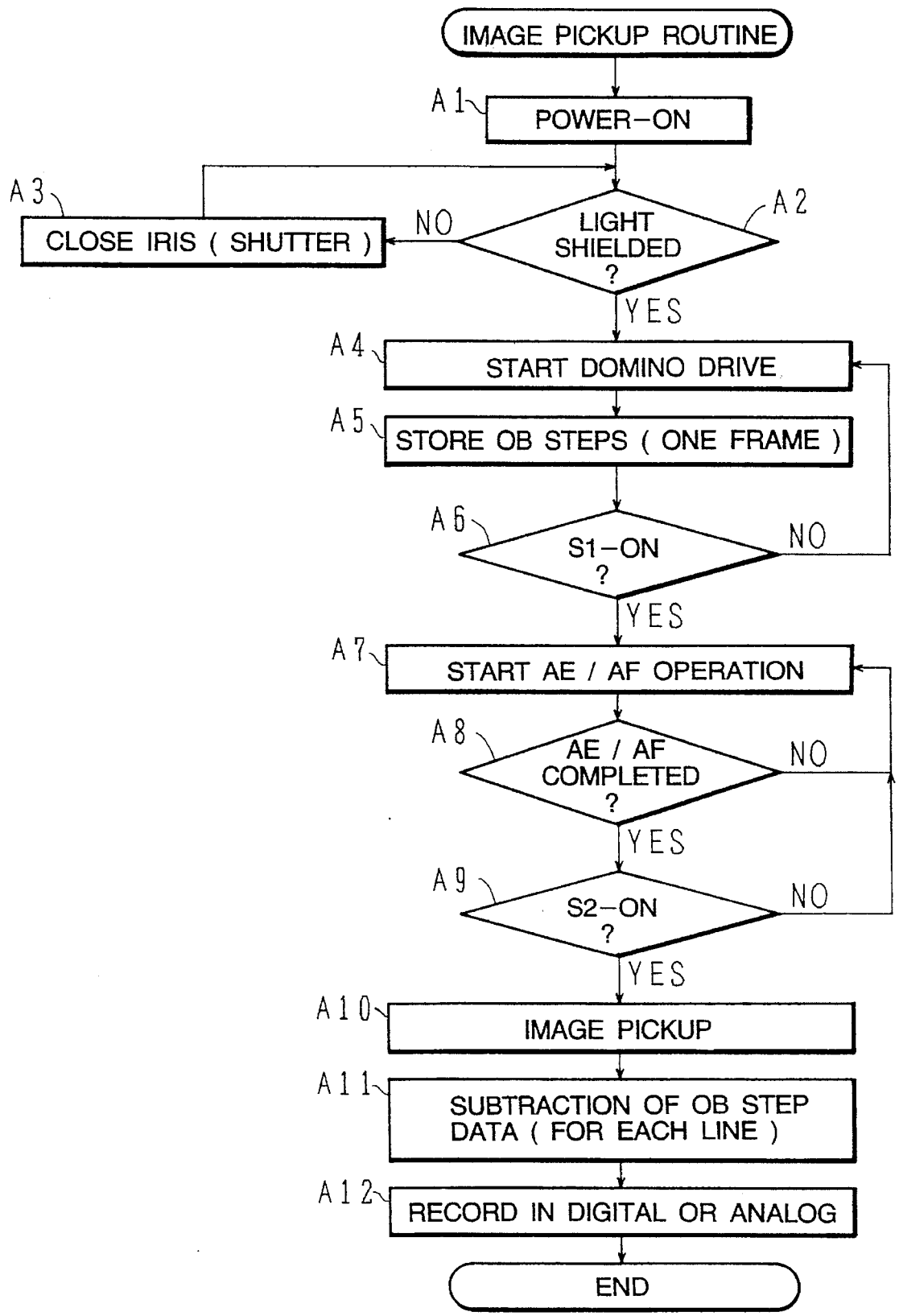
FIG. 4 is a flow chart illustrating an image pickup routine according to an embodiment of the present invention.

FIG. 4 is a flow chart illustrating the image pickup routine of the CCD image pickup device having the structure shown in FIG. 1.

When a power is turned on at Step A1, the flow advances to Step A2 to check whether the image pickup device is in a light shielded state or not. If the image pickup device is not in a light shielded state, the flow follows a NO arrow to advance to Step A3 where the iris 2 is closed to make the CCD image pickup chip 3 enter the light shielded state. After the iris 2 is closed, the flow goes again to Step A2 and in this case the flow follows a YES arrow to advance to Step A4.

At Step A4, the VCCDs are driven by a domino method to transfer electric charges stored in the VCCDs under the light shielded state. The obtained black level information is stored in an OB step memory such as the black level memory 11 shown in FIG. 1.

In this embodiment, the OB step memory such as the black level memory 11 has a capacity of one frame and stores the black levels of all pixels.

Next, it is checked at Step A6 whether the first contact switch S1 is turned on or not. If the first contact switch 51 is not turned on, without entering an image pickup state, the flow follows a NO arrow to return to Step A4.

If the first contact switch S1 is turned on, the flow follows a YES arrow to advance to Step AT where the automatic exposure and autofocussing (AE/AF) operation starts for the image pickup preparation.

Next, it is checked at Step A8 whether the AE/AF operation has been completed. If the AE/AF operation has not been completed the flow follows a NO arrow to return to Step AT. If the AE/AF operation has not been completed the flow follows a YES arrow to advance to Step A9 where it is checked whether the second contact switch S2 is being turned on. If the second contact switch 52 is not turned on, the flow follows a NO arrow to return to Step A7.

If the second contact switch S2 is turned on, the flow follows a YES arrow to advance to Step A10 where the image pickup operation is performed. During this operation, the black level information of one frame previously obtained and the video information of the subject of one frame are provided.

Next, at Step A11, the black level of the OB step is subtracted from the video signal to obtain a real video signal. This subtraction operation is performed for each row of the pixel matrix to obtain a real video signal of each horizontal scan line.

The video signal with the noise component being removed in the above manner is recorded at Step A12. The video signal may be recorded in either a digital or analog manner. The recording may be magnetic or non-magnetic. The image pickup routine is thus completed.

The background of a displayed image can be fully corrected by the subtraction process using the black level information of one frame. It is possible to compensate for not only a dark current component but also white scratches caused by defects on the CCD image pickup chip.

If the dark current component, whose amount only depends on the position on each VCCD which is to be compensated, then it is sufficient to use only one black level per one row. This is because the video signals on the same row have the same stop time and transfer time. In this case, the capacity of the black level memory 11 can be reduced greatly.

Figure 5:
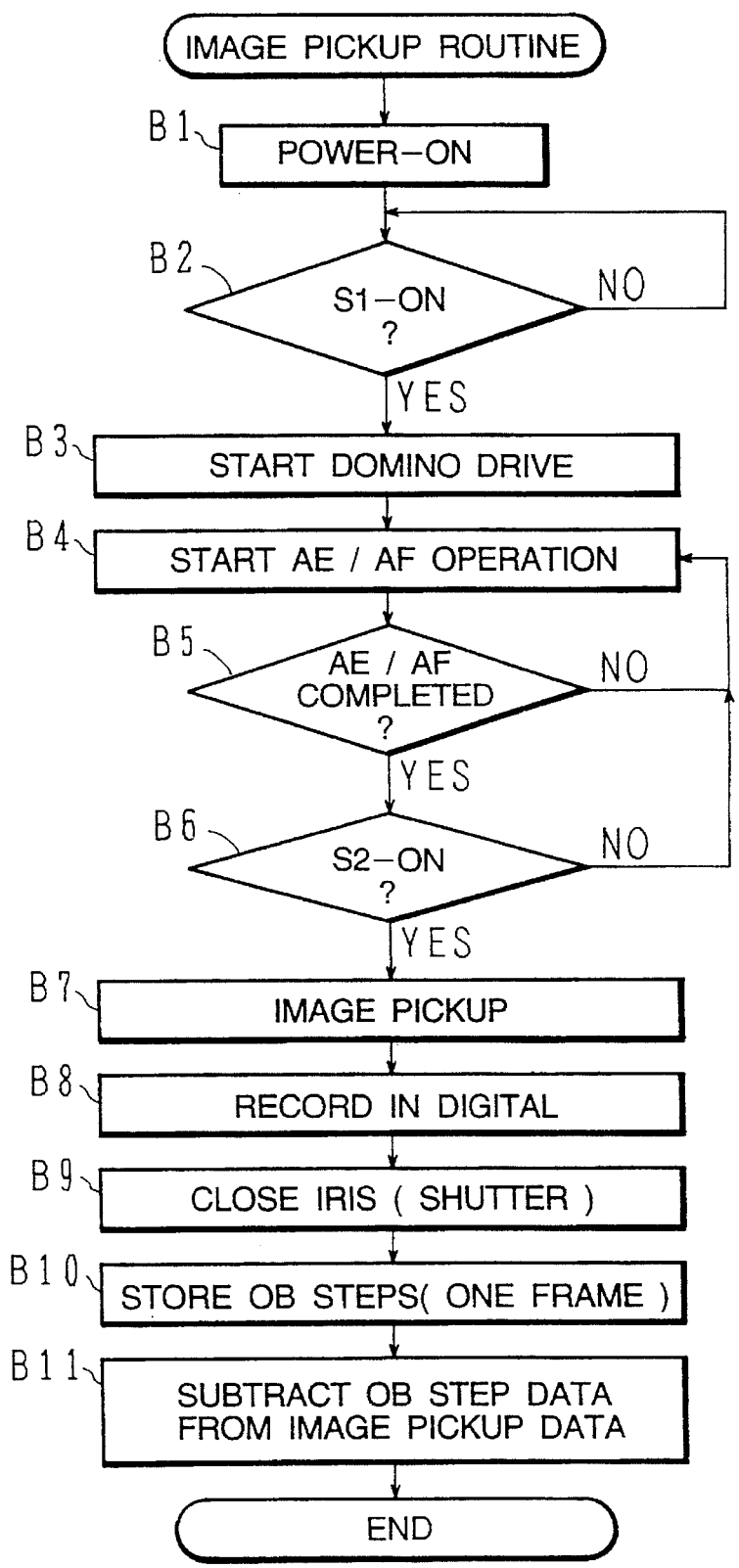
FIG. 5 is a flow chart illustrating an image pickup routine according to another embodiment of the present invention.

FIG. 5 is a flow chart illustrating the image pickup routine according to another embodiment of the present invention. A power is turned on at Step B1. Next, it is checked at Step B2 whether the first contact switch S1 is turned on. If the first contact switch 51 is not turned on the flow follows a NO arrow to repeat Step B2.

If the first contact switch S1 is turned on, the flow follows a YES arrow to advance to Step B3 to start the domino drive. Then, at Step B4, the automatic exposure and autofocussing (AE/AF) operation starts for the image pickup preparation.

Next, it is checked at Step B5 whether the AE/AF operation has been completed. If the AE/AF operation has not been completed, the flow follows a NO arrow to return to Step B4. If the AE/AF operation has been completed, the flow follows a YES arrow to advance to Step B6 where it is checked whether the second contact switch S2 is turned on.

If the second contact switch S2 is not turned on, the flow follows a NO arrow to return to Step B4. If the second contact switch 52 is turned on, the flow follows a YES arrow to advance to Step B7 to perform the image pickup operation. In this manner, image information containing the dark current component is obtained.

Next, at step B8 the image information obtained by the image pickup operation is stored in the memory 7 of FIG. 1 in the form of digital signals.

Next, at Step B9 the iris is closed. Thereafter, at Step B10 the VCCDs are driven by a domino method to transfer electric charges of one frame and store OB step information in the black level memory 11.

At Step B11, the OB step signal is subtracted from the video signal to remove the dark current component. Image information with the dark current being removed is obtained in this manner, and the image pickup routine is completed.

In both the image pickup routines shown in FIGS. 4 and 5, the dark current component is subtracted from the image information containing the dark current component to obtain image information whose OB step level has been compensated for. The dark current component can be compensated by OB step level information of one column.

The background of a displayed image as well as white scratches can be fully corrected if dark current components of one frame are stored.

Figure 6:
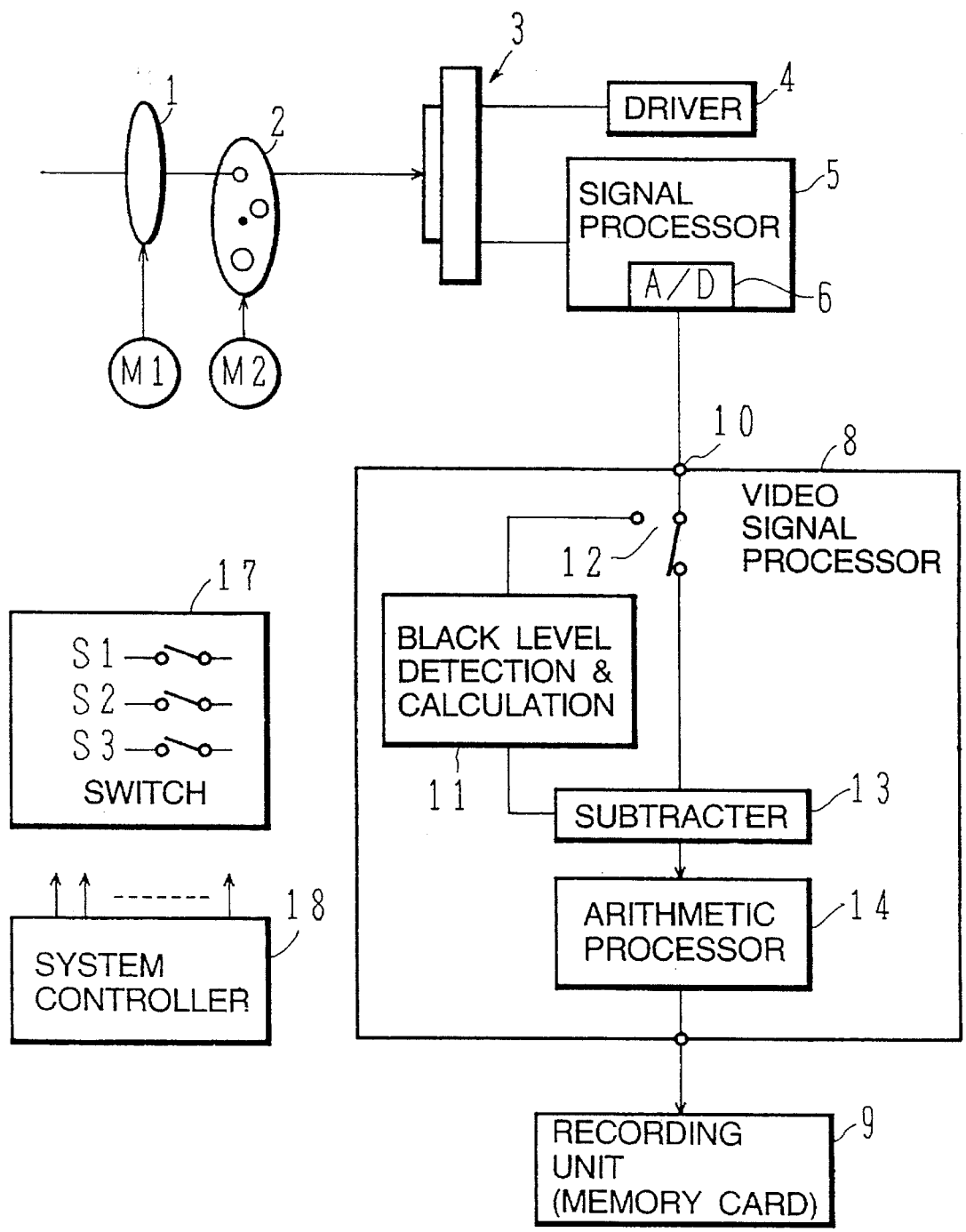
FIGS. 6 is a block diagram showing the structure of a CCD image pickup device according to another embodiment of the present invention.

FIG. 6 is a block diagram showing the structure of a CCD image pickup device according to another embodiment of the present invention. Similar to the CCD image pickup device shown in FIG. 1, light from a subject is focussed by a lens 1, is passed through an opening of an iris 2, and is projected on a CCD image pickup chip 3. Implemented in the CCD image pickup chip 3 is a semiconductor image pickup circuit including a photodiode matrix, VCCDs, a HCCD, and other circuit elements. A driver circuit 4 supplies CCD drive signals to the CCD image pickup chip 3. In this embodiment, as will be later described, the OB area of the CCD image pickup chip 3 is different from that shown in FIG. 1.

A video signal from the CCD image pickup chip 3 is processed by a signal processor 5 to perform a process of detecting a signal level difference at an OB area or other processes. The processed video signal is converted into a digital signal by an A/D converter 6 and inputted to a video signal processor 8.

An input terminal 10 of the video signal processor 8 is connected to a movable contact of a change-over switch 12. Fixed contacts of the change-over switch 12 are connected to a black level detection and calculation circuit 11 and to a subtracter 13. This black level detection and calculation circuit 11 estimates black levels from detected black levels, and is different from the case of the black level memory 1 shown in FIG. 1 which stores video data in the light shielded stake.

In this embodiment, the black level detection and calculation circuit 11 obtains shading components of one frame by means of extrapolation based upon signals supplied from a lower OB area at the initial stage during the vertical scan period, and generates all black level signals. An output signal from the black level detection and calculation circuit 11 is supplied to the subtracter 18 by which the black level signal is subtracted from the video signal of a subject image.

An output signal from the subtracter 13 is supplied to an arithmetic processor 14 to be subjected to a process such as data compression, and outputted from an output terminal to a recording unit 9 which may be a memory card.

The CCD image pickup device has a switch circuit 17 having switches S1, S2, and S3. For example, the switch S1 is a first contact switch for a release switch, the switch S2 is a second contact switch for the release switch, and the switch S3 is a power source switch.

When a switch button on a camera is depressed, the power source switch S3 is first turned on, and thereafter, the first and second contact switches S1 and S2 are sequentially turned on.

The CCD image pickup device is also provided with a system controller 18 for controlling the entire system of the CCD image pickup device. When the power source switch S3 is turned on, the CCD image pickup device is powered and enters an image pickup enabled state. When the first contact switch S1 is turned on, the CCD image pickup device enters an automatic exposure and autofocussing mode. In this automatic exposure and autofocusing mode, motors M1 and M2 are driven to select a proper focal length of the lens 1 and a proper opening of the iris 2. A shutter speed is also selected.

The CCD image pickup chip 3 performs an accordion transfer (or domino transfer) described with FIGS. 12A and 12B for the VCCDs. In this case, as described previously, the video signal read from photodiodes stays on the VCCD during a certain time which changes with the position of the video signal on the VCCD.

A video signal staying on the VCCD during a relatively long time receives a relatively large dark current. The corresponding dark current component is calculated by the black level detection and calculation circuit 11. The black level signal is subtracted from the video signal by the subtracter 13 so that a video signal with the dark current component being removed therefrom can be obtained.

Figure 7A:
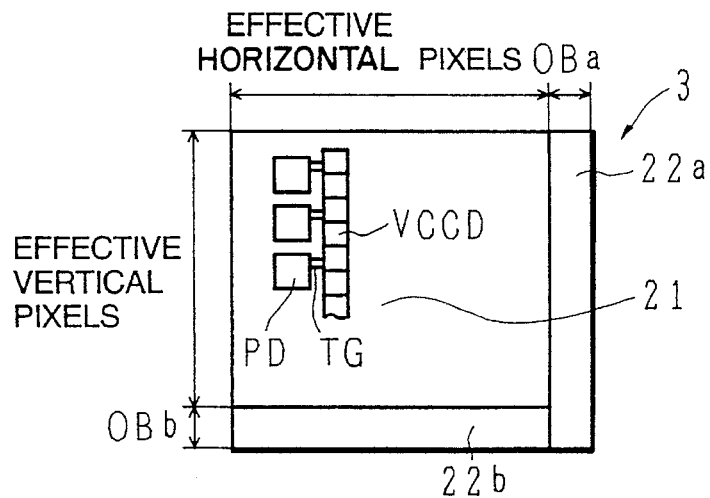
FIGS. 7A, 7B, and 7C are diagrams showing the structure of a CCD image pickup chip used in the CCD image pickup device shown in FIG. 6.
Figure 7B:
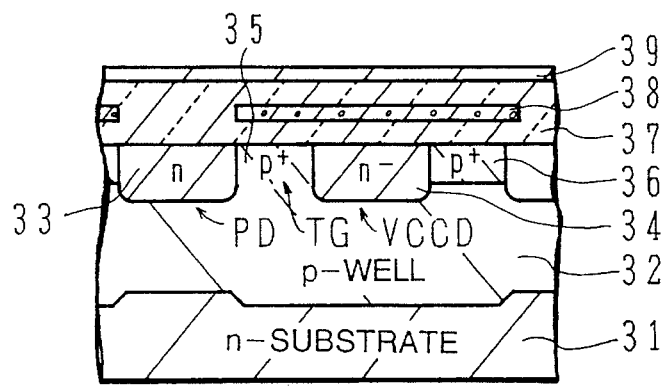
Figure 7C:
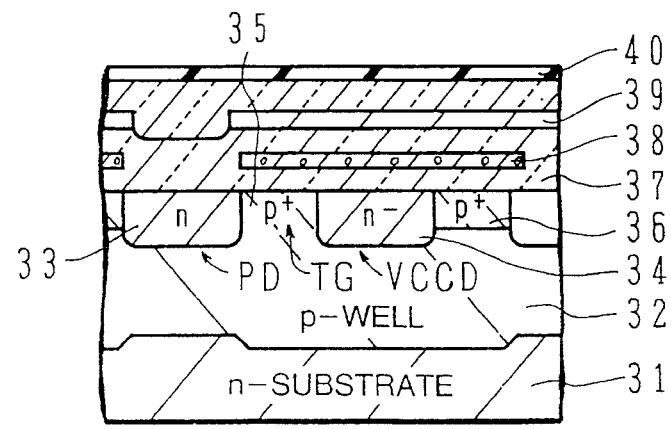

FIGS. 7A, 7B and 7C show the structure of the CCD image pickup chip. FIG. 7A shows the layout of the CCD image pickup chip.

The CCD image pickup chip 3 has an image pickup area 21 on which a subject image is projected, and an OB area 22 covered with a light shielding film. On the image pickup area 21, there are formed a number of photodiodes PDs disposed in a matrix shape, VCCDs formed adjacent respective photodiodes columns, transfer gates for controlling the transfer of electric charges from photodiodes to VCCDs, and other circuit components.

The OB area 22 includes an OBb area 22b disposed at the lower area of the image pickup area 21 and light shielded by an insulating material such as a filter and a light shielding plate. The OB area 22 also includes an OBa area 22a disposed at the right side area of the image pickup area 21 and light shielded with metal such as aluminum. As will be described later, the OBa area 22a at the right side area of the image pickup area 21 is not necessarily required.

FIG. 7B is a cross section showing the structure of a pixel in the OBa area.

A p-type well 32 is formed on an n-type Si substrate 31. On the surface of the p-type well 32, there are formed an n-type region 33 for forming a photodiode PD, an $n^-$-type region 34 for forming a VCCD, and a $p^+$-type region 35 for forming a transfer gate TG between the photodiode and the VCCD. A $p^+$-type region 36 is formed at the periphery of the area in which the photodiode and VCCD are formed. This $p^+$-type region 36 functions as an electrically isolating region.

An insulating film 37 such as $SiO_2$ is formed on the top surface of the structure. A polycrystalline silicon gate 38 is formed in the insulating film 37 for the control of potentials at the transfer gate TG and VCCD. The surface of the insulating film 37 is covered with a light shielding metal layer 39 such as aluminum, so that light is shielded from the photodiode PD.

In a pixel of the image pickup area 21, an opening is formed in the light shielding metal layer 39 to allow incident light to inject on the photodiode PD. The photodiode PD detects the intensity of incident light. Photoelectrically converted electric charges of the incident light are transferred via the transfer gate TG to the VCCD, and picked up therefrom to obtain a video signal of a subject image.

FIG. 7C is a cross section showing the structure of a pixel in the OBb area. The structures of the semiconductor substrate and insulating layer 37 are the same as those of the image pickup area, except that a light shielding member 40 made of an insulating material such as a filter and a light shielding plate is disposed over the aluminum light shielding layer 39 having the opening.

As a result, light will not enter the photodiode PD formed on the semiconductor substrate. It is to be noted that the light shielding member 40 will not affect the electrostatic characteristics of the pixels. When this OBb area is driven in the same manner as the pixel in the image pickup area, an electric charge signal read from the VCCD is only the dark current component.

A difference between the structures of the image pickup area and OBa and OBb areas is a presence of the light shielding metal layer 39 over the photodiode PD in the OBa area. This structural difference produces a difference of parasitic capacitance between the pixels in the image pickup area and OBa and OBb areas. Therefore, the amount of dark current generated on the VCCD is affected. In the OBb area, the light shielding metal layer 39 is not present over the photodiode as in the image pickup area. However, the light shielding member 40 made of an insulating material not affecting the electrostatic characteristics is formed. Therefore, no light enters in the OBb area and a dark current substantially the same as in the image pickup area can be detected.

Figure 8A:
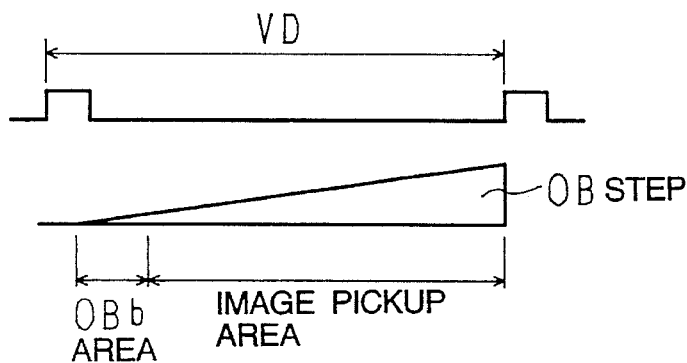
FIGS. 8A, 8B, and 8C are graphs showing the waveforms of video signals.
Figure 8B:
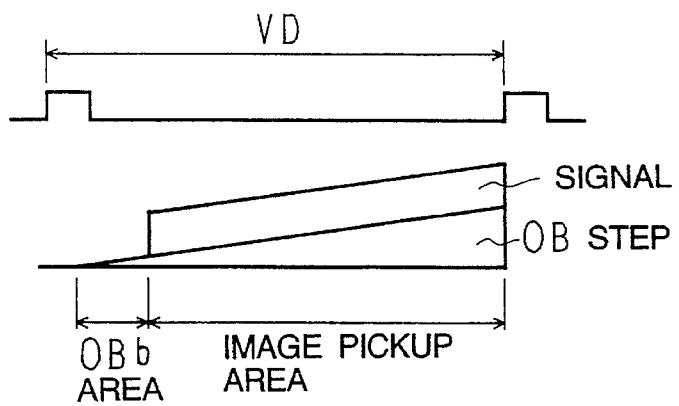
Figure 8C:
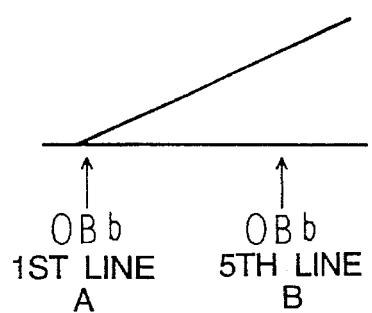

FIGS. 8A, 8B, and 8C are diagrams explaining different levels of an OB step. FIGS. 8A shows a CCD output signal in the light shielded state, and FIG. 8B shows a CCD output signal in the image pickup state. As shown in FIG. 7A, in the CCD image pickup chip, a number of photodiodes PD are disposed in a matrix shape in the image pickup area 21. A VCCD is disposed adjacent each photodiode PD column, with the transfer gate TG coupling the photodiode and VCCD.

Electric charge signals read from the photodiodes PD to the VCCDs are sequentially transferred downward in the paths. The stay time on the VCCD changes greatly between the video signal stored in the photodiode PD at the lower area in the image pickup area 21 and that stored at the upper area.

For example, the time that the video signal read from the photodiode PD at the lowest row stops on the VCCD is one horizontal scan time or 1 H, and the time required for the video signal to be read to the HCCD is 1 H.

In contrast with this, the time that the video signal read from the photodiode PD at the highest row to the VCCD stops for 500 H assuming that the number of rows is 1000, and the time required for the video signal to be transferred to the HCCD is 500 H, requiring 1000 H in total.

The stop time and transfer time change greatly with the position of a video signal on the VCCD. Therefore, the level of the OB step changes greatly depending on the position of a video signal in the image pickup area, as shown in FIGS. 8A and 8B. An output in the light shielded state shown in FIG. 8A is only a dark current, and FIG. 8B shows both a video signal and dark current superposed on the video signal.

As shown in FIGS. 8A and 8B, the base line of a video signal is raised and the level of the OB step becomes large, as the position of the signal in the vertical direction becomes high. The image is displayed brighter at the lower area of the screen, as described with respect to FIG. 3F.

In this embodiment, as shown in FIG. 7A, the OBb area 22b is formed at the lower area of the image pickup area 22, and the OBb area 22b has the same electrostatic characteristics as the image pickup area. Since the OBb area 22b is light shielded by the light shielding member 40, only the dark current is generated in the OBb area 22b. This dark current has the same characteristics as those of the dark current in the image pickup area, as shown in FIG. 8A.

Only a dark current component is generated in the OBb area even when light is incident to the image pickup area, as shown in FIG. 8B. This dark current in the OBb area has the same characteristics as those of the dark current in the image pickup area.

As illustrated in FIG. 8C, it is possible to obtain an OB step increment per one line by detecting dark currents in the OBb area. In this manner, OB steps of the whole image pickup area 21 can be estimated by means of extrapolation using the detected OB steps.

The black level detection and calculation circuit 11 shown in FIG. 6 is implemented at the lower area of the image pickup area. This black level detection and calculation circuit 11 detects the dark currents in the OBb area having the same electrostatic characteristics as the image pickup area, to thereby generate black level signals. A black level signal is subtracted from a video signal detected from the image pickup area by the subtracter 13, so that a real image signal with the OB step being removed therefrom can be obtained.

Since the black level signal is subtracted from the video signal by the subtracter 13, the black level signal of the OBa area at each horizontal line is not necessarily required. Therefore, the OBa area 22a in the image pickup area 21 at the right side area may be omitted.

If the OBa area 22a is omitted, the OB step is removed from a video signal on each horizontal scan line. The OBa area at each horizontal scan line is not necessarily required. A change in the base line of a video signal caused by a dark current component is called the OB step in this specification.

Figure 9A:
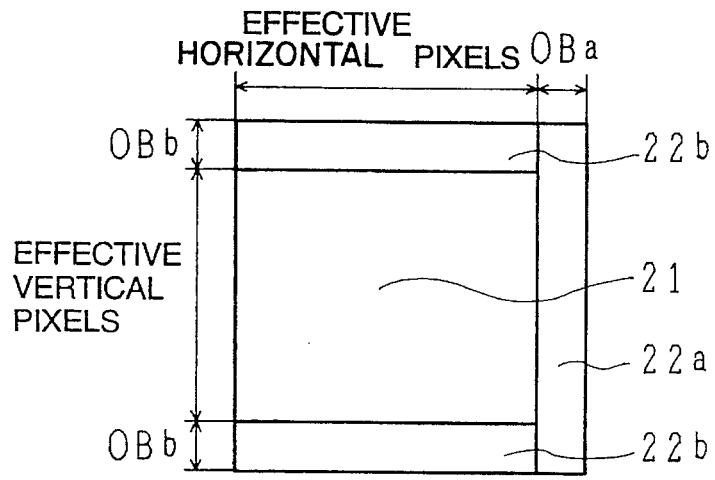
FIGS. 9A, 9B, and 9C are diagrams explaining another embodiment of the present invention.
Figure 9B:
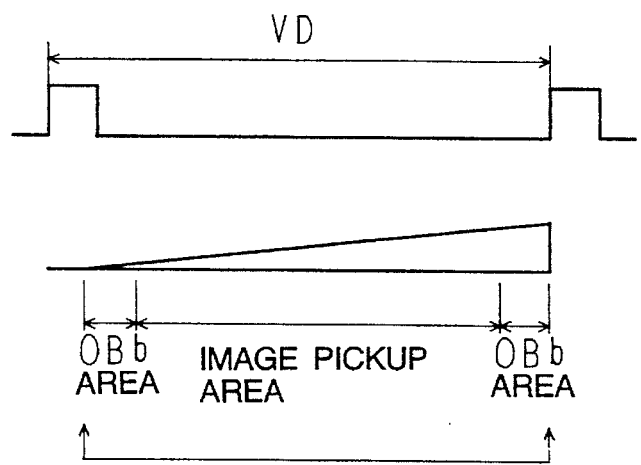
Figure 9C:
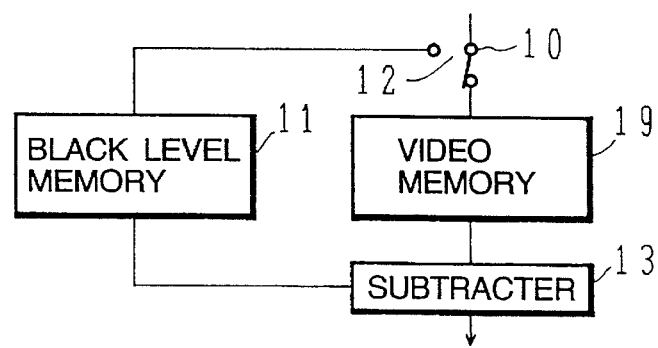

FIGS. 9A, 9B, and 9C are diagrams showing a CCD image pickup device according to another embodiment of the present invention. FIG. 9A is a plan view showing the layout of a CCD image pickup chip.

In this embodiment, the OBa area 22a is formed at the right side area of the image pickup area 21, which is the same structure as used in FIG. 7A. However, OBb areas 22b having the same electrostatic characteristics as the image pickup area are formed at upper and lower areas of the image pickup area 21. As shown in FIG. 9B, dark currents in the light shielded state is outputted from the CCD image pickup chip starting from the lower OBb area, image pickup area, and upper OBb area, in this order. These areas have the same electrostatic characteristics so that the generated dark currents have the same characteristics.

Since the upper and lower OBb areas having the same electrostatic characteristics are disposed at the upper and lower areas of the image pickup area, the OB steps at the whole image pickup area can be estimated by means of interpolation using OB steps detected at the upper and lower OBb areas by the black level detection and calculation circuit 11.

In this embodiment, since OB steps at the image pickup area cannot be calculated until all pixel signals are read, a video memory 19 as shown in FIG. 9C is connected to the image signal processor 8 shown in FIG. 6. The black level detection and calculation circuit 11 detects the shading components of the OBb areas at the initial and final stages during the vertical scan period, and calculates and estimates the black levels at the whole image pickup area, and outputs them. The black level signal is subtracted from the video signal stored in the video memory 19 by the subtracter 13 to output a real video signal with the shading components being removed therefrom.

In all the embodiments shown in FIGS. 6, 7A to 7C, and 9A to 9C, the black level detection and calculation circuit 11 calculates and estimates properly the shading components (black levels) at the whole image pickup area. The shading components are subtracted from the video signal by the subtracter 13 to supply only a real video signal to the arithmetic processor 14.

Figure 10:
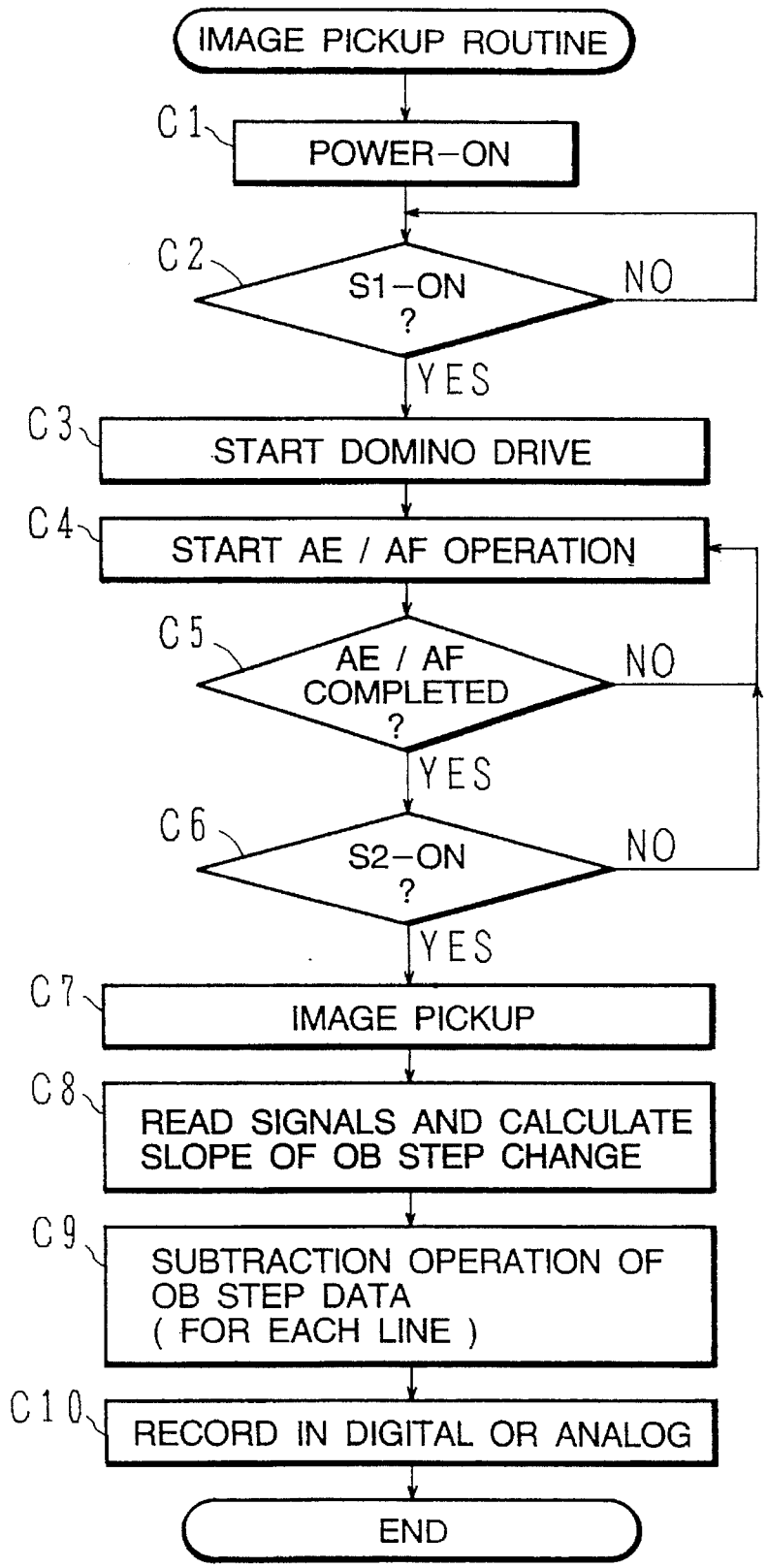
FIG. 10 is a flow chart illustrating an image pickup routine of the embodiment shown in FIGS. 7A, 7B, and 7C and 8A, 8B, and 8C.

FIG. 10 is a flow chart illustrating the image pickup routine to be executed by the CCD image pickup device having the structure shown in FIGS. 6, 7A to 7C, and 8A to 8C.

When a power is turned on at Step C1, the flow advances to Step C2 to check whether the first contact switch S1 is being turned on. If the first contact switch 51 is not turned on, the flow follows a NO arrow to repeat Step C2.

If the first contact switch S1 is turned on, the flow follows a YES arrow to advance to Step C3 to start the domino drive of the VCCDs and transfer electric charges to the HCCD.

Next, at Step C4, the automatic exposure and autofocussing (AE/AF) operation starts for the image pickup preparation. It is then checked at Step C5 whether the AE/AF operation has been completed. If the AE/AF operation has not been completed, the flow follows a NO arrow to return to Step C4.

If the AE/AF operation has been completed, the flow follows a YES arrow to advance to Step C6 where it is checked whether the second contact switch S2 is turned on. If the second contact switch 52 is not turned on, the flow follows a NO arrow to return to Step C4.

If the second contact switch S2 is turned on, the flow follows a YES arrow to advance to Step C7 to perform the image pickup operation. During this image pickup operation, the dark current at the OBb area is first outputted from the CCD image pickup chip, and then a video signal is outputted from the image pickup area.

At Step C8, signals outputted from the CCD image pickup chip are read to detect the dark current components at the OBb area obtained at the initial stage. From these dark current components, dark current components in the whole image pickup area are calculated by means of extrapolation. In this manner, the slope of the OB step change is obtained.

At Step C9, the OB step data is subtracted from the video signal to obtain a real video signal for each row, with the dark current component being removed. The video signal with the OB step being removed therefrom is recorded in the recording unit. Recording the video signal may be performed either in an analog or digital manner. In this way, the image pickup routine is completed.

Figure 11:
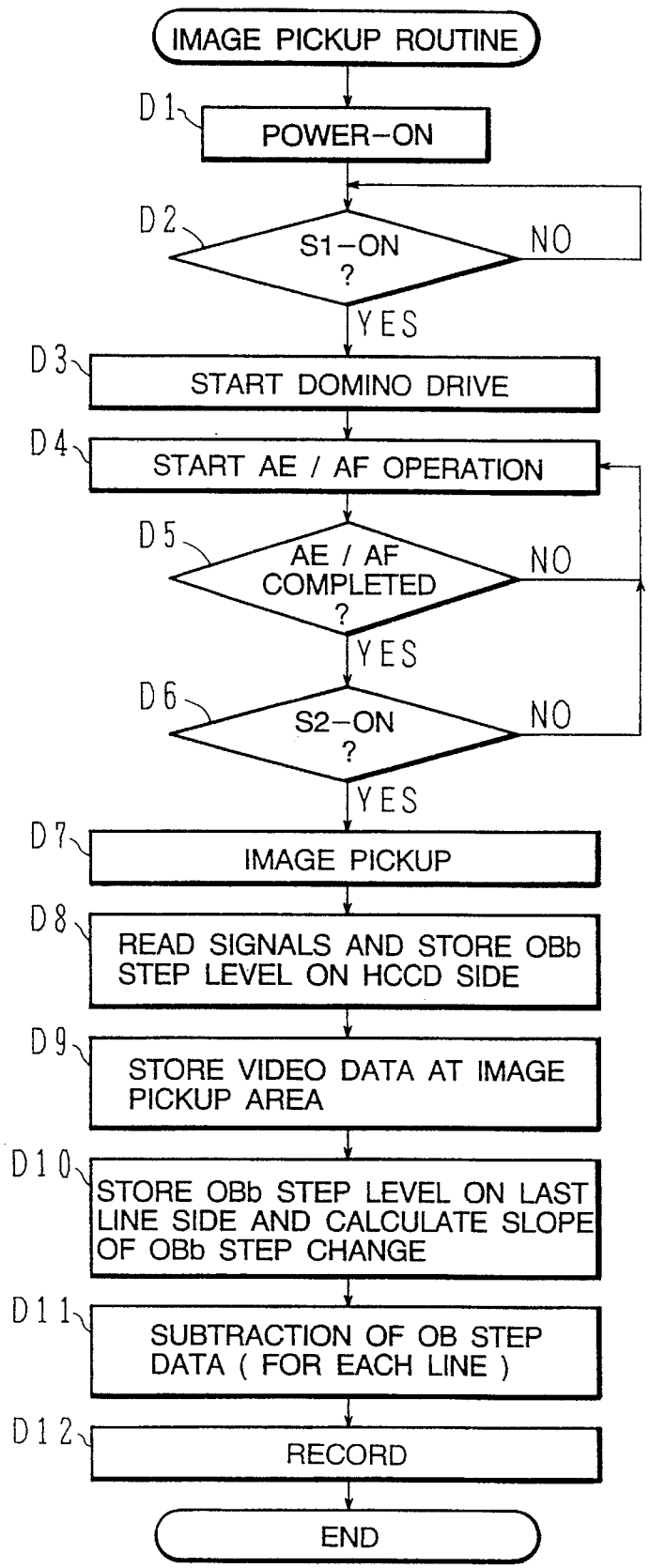
FIG. 11 is a flow chart illustrating an image pickup routine of the embodiment shown in FIGS. 9A, 9B, and 9C.

FIG. 11 is a flow chart illustrating the image pickup routine to be executed by the CCD image pickup device having the structure shown in FIGS. 9A, 9B, and 9C.

When a power is turned on at Step D1, the flow advances to Step D2 to cheek whether the first contact switch S1 is turned on. If the first contact switch 51 is not turned on, the flow follows a NO arrow to repeat Step D2.

If the first contact switch S1 is turned on, the flow follows a YES arrow to advance to Step D3 to start the domino drive. Next, at Step D4 the automatic exposure and autofocussing (AE/AF) operation starts for the image pickup preparation.

It is then checked at Step D5 whether the AE/AF operation has been completed. If the AE/AF operation has not been completed, the flow follows a NO arrow to return to Step D4.

If the AE/AF operation has been completed, the flow follows a YES arrow to advance to Step D6 where it is checked whether the second contact switch S2 is turned on.

the second contact switch S2 is not turned on, the flow follows a NO arrow to return to Step D4. If the second contact switch 52 is turned on, the flow follows a YES arrow to advance to Step D7 to perform the image pickup operation. During this image pickup operation, the video signal containing the dark current component can be obtained. At Step D8, signals are read from all pixels. The OB step level of the OBb area read at the initial stage is stored in the black level detection and calculation circuit 11 shown in FIG. 11.

Next, at Step D9, data read from the image pickup area is stored in the video memory 19 shown in FIG. 9C.

At Step D10, the OB step level of the OBb area read at the final stage is stored in the black level detection and calculation circuit 11. At the black level detection and calculation circuit 11, the OB step levels at the image pickup area are calculated and estimated from the OB step levels read at the initial and final stages by interpolation.

After the OB step levels at the whole image pickup area are obtained, the OB step signal supplied from the black level detection and calculation circuit 11 is subtracted from the video signal supplied from the video memory at the subtracter to obtain a real video signal.

In the above manner, video information with the shading component being removed can be obtained for each line. This video information is recorded in the recording unit at Step D12. The image pickup routine is completed when the video information with the dark current being removed is obtained.

In both the image pickup routines shown in FIGS. 10 and 11, the dark current component is subtracted from the image information containing the dark current component to obtain image information whose OB step level has been calibrated. The OB area having the same electrostatic characteristics as the image pickup area may be provided at one area of the image pickup area or at both the upper and lower areas, the former case simplifying the device structure and the latter case improving the precision of dark current detection and estimation.

The present invention has been described in connection with the preferred embodiments. The invention is not limited to the embodiments only, but it is apparent that various changes, improvements, combinations and the like may be made by those skilled in the art.

I claim:

1. A CCD image pickup device including an image pickup chip, said image pickup chip comprising:

a plurality of vertical charge transfer paths for transferring electric charges;

a horizontal charge transfer path for collectively outputting charge signals transferred from said plurality of vertical charge transfer paths;

a plurality of first photodiodes disposed in a central portion of an image pickup area for generating video signals, said first photodiodes being coupled to said plurality of vertical charge transfer paths and being disposed in a matrix of plural columns and rows;

a plurality of second photodiodes disposed at a first optical black area in a bottom portion of said image pickup area, each of said second photodiodes at said first optical black area being disposed between said first photodiodes at said image pickup area and said horizontal charge transfer path, being coupled to a respective one of said plurality of vertical charge transfer paths, being light shielded, and having the same electrostatic characteristics as each of said first photodiodes at said image pickup area; and processing means for calculating a dark current increment representative of dark current generated in said plurality of vertical charge transfer paths per row of the matrix at said image pickup area in accordance with signals from said second photodiodes at said first optical black area and for estimating dark current components for all of said image pickup area in accordance with said dark current increment.

2. The CCD image pickup device according to claim 1, wherein said second photodiodes at said first optical black area have a light shielding mask made of an insulating material.

3. The CCD image pickup device according to claim 1, wherein said processing means executes an extrapolation operation.

4. The CCD image pickup device according to claim 1, wherein said image pickup chip further comprises a plurality of third photodiodes at a second optical black area in a top portion of said image pickup area relative to said horizontal charge transfer path, each of said third photodiodes at said second optical black area being coupled to a respective one of said plurality of vertical charge transfer paths, being light shielded, and having the same electrostatic characteristics as each of said first photodiodes at said image pickup area, and said processing means has a function to execute an interpolation operation in accordance with signals from said second and third photodiodes and a video memory for storing said video signal read from said image pickup area.

5. The CCD image pickup device according to claim 4, wherein said third photodiodes at said second optical black area have a light shielding mask made of an insulating material.

6. A method of driving a CCD image pickup device having an image pickup chip to produce video signals with reduced dark current, said image pickup chip including a plurality of vertical charge transfer paths for transferring electric charges, a horizontal charge transfer path for collectively outputting charge signals transferred from said plurality of vertical charge transfer paths, a plurality of first photodiodes disposed in a central portion of an image pickup area in a matrix of plural columns and rows for picking up the video signals, said first photodiodes being coupled to said plurality of vertical charge transfer paths, and a plurality of second photodiodes disposed at an optical black area in a bottom portion of said image pickup area, each of said second photodiodes at said optical black area being disposed between said first photodiodes at said image pickup area and said horizontal charge transfer path, being coupled to a respective one of said plurality of vertical charge transfer paths, being light shielded, and having the same electrostatic characteristics as each of said first photodiodes at said image pickup area, said method of driving comprising the steps of:

calculating a dark current increment representative of dark current generated in said plurality of vertical charge transfer paths per row of the matrix at said image pickup area in accordance with signals read from said second photodiodes at said optical black area;

estimating dark current components for all of said image pickup area by an extrapolation operation in accordance with said dark current increment; and subtracting said dark current components estimated by said extrapolation operation from said video signals read from said first photodiodes at said image pickup area.

7. A method of driving a CCD image pickup device having an image pickup chip to produce video signals with reduced dark current, said image pickup chip including a plurality of vertical charge transfer paths for transferring electric charges, a horizontal charge transfer path for collectively outputting charge signals transferred from said plurality of vertical charge transfer paths, a plurality of first photodiodes disposed in a matrix of plural columns and rows in a central portion of an image pickup area for picking up the video signals, said first photodiodes being coupled to said plurality of vertical charge transfer paths, a plurality of second photodiodes disposed at a first optical black area in a bottom portion of said image pickup area, each of said second photodiodes at said first optical black area being disposed between said first photodiodes at said image pickup area and said horizontal charge transfer path, being coupled to a respective one of said plurality of vertical charge transfer paths, being light shielded, and having the same electrostatic characteristics as each of said first photodiodes at said image pickup area, and a plurality of third photodiodes disposed at a second optical black area at a top portion of said image pickup area relative to said horizontal charge transfer path, each of said third photodiodes at said second optical black area being coupled to a respective one of said plurality of vertical charge transfer paths, being light shielded, and having the same electrostatic characteristics as each of said first photodiodes at said image pickup area, said method of driving comprising the steps of:

calculating a dark current increment representative of dark current generated in said plurality of vertical charge transfer paths per row of the matrix at said image pickup area in accordance with signals read from said second and third photodiodes at said first and second optical black areas;

estimating dark current components for all of said image pickup area by an extrapolation operation in accordance with said dark current increment; and subtracting said dark current components estimated by said extrapolation operation from said video signals read from said first photodiodes at said image pickup area.

8. A method of driving a CCD image pickup device having an image pickup chip to produce video signals with reduced dark current, the method comprising the steps of:

(a) projecting a subject image on the image pickup chip to generate electric charges in a plurality of first photodiodes disposed in a matrix of plural columns and rows in a central portion of the image pickup chip;

(b) transferring the electric charges from said first photodiodes to a plurality of vertical charge transfer paths of the image pickup chip;

(c) collectively outputting and reading the electric charges transferred along said plurality of vertical charge transfer paths from a horizontal charge transfer path of the image pickup chip as video signals;

(d) collectively outputting and reading signals generated in a plurality of second photodiodes disposed at an optical black area in a bottom portion of said image pickup area between said first photodiodes and said horizontal charge transfer path, each of said plurality of second photodiodes being coupled to a respective one of said plurality of vertical charge transfer paths, being light shielded and having the same electrostatic characteristics as each of said first photodiodes;

(e) calculating a dark current increment representative of dark current generated in said plurality of vertical charge transfer paths per row of the matrix at said image pickup area in accordance with the signals read from said second photodiodes at said optical black area during said step (d);

(f) estimating dark current components for all of said image pickup area by an extrapolation operation in accordance with said dark current increment; and (g) subtracting said dark current components estimated by said extrapolation operation during said step (f) from the video signals read from said first photodiodes at said image pickup area during said step (c).

9. A method of driving a CCD image pickup device having an image pickup chip to produce video signals with reduced dark current, the method comprising the steps of:

(a) projecting a subject image on the image pickup chip to generate electric charges in a plurality of first photodiodes disposed in a matrix of plural columns and rows in a central portion of the image pickup chip;

(b) transferring the electric charges from said first photodiodes to a plurality of vertical charge transfer paths of the image pickup chip;

(c) collectively outputting and reading the electric charges transferred along said plurality of vertical charge transfer paths from a horizontal charge transfer path of the image pickup chip as video signals;

(d) collectively outputting and reading first signals generated in a plurality of second photodiodes disposed at a first optical black area in a bottom portion of said image pickup area between said first photodiodes and said horizontal charge transfer path, each of said plurality of second photodiodes being coupled to a respective one of said plurality of vertical charge transfer paths, being light shielded and having the same electrostatic characteristics as each of said first photodiodes;

(e) collectively outputting and reading second signals generated in a plurality of third photodiodes disposed at a second optical black area in a top portion of said image pickup area relative to said horizontal charge transfer path, each of said third photodiodes being coupled to a respective one of said plurality of vertical charge transfer paths, being light shielded and having the same electrostatic characteristics as each of said first photodiodes;

(f) calculating a dark current increment representative of dark current generated in said plurality of vertical charge transfer paths per row of the matrix at said image pickup area in accordance with the first and second signals read from said second and third photodiodes at said first and second optical black areas during said steps (d) and (e);

(g) estimating dark current components for all of said image pickup area by an extrapolation operation in accordance with said dark current increment; and (h) subtracting said dark current components calculated during said step (f) by said extrapolation operation from the video signals read from said first photodiodes at said image pickup area during said step (c).

* * * * *